F. GROFF.
VEHICLE CUSHION WHEEL.
APPLICATION FILED APR. 7, 1908.

928,601.

Patented July 20, 1909.
2 SHEETS—SHEET 1.

Witnesses
F. L. Ourand
J. P. Duffie

Inventor,
F. Groff,
By John S. Duffie, Attorney

F. GROFF.
VEHICLE CUSHION WHEEL.
APPLICATION FILED APR. 7, 1908.
928,601.
Patented July 20, 1909.
2 SHEETS—SHEET 2.
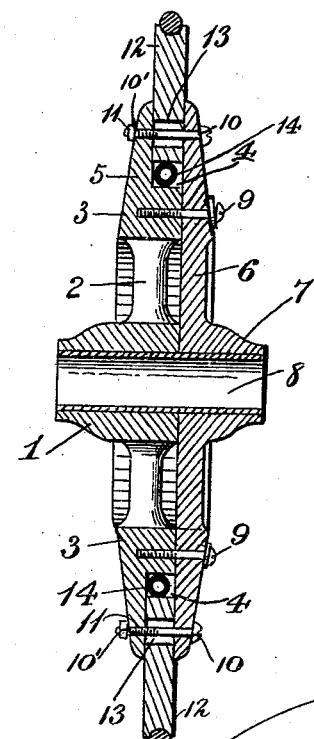
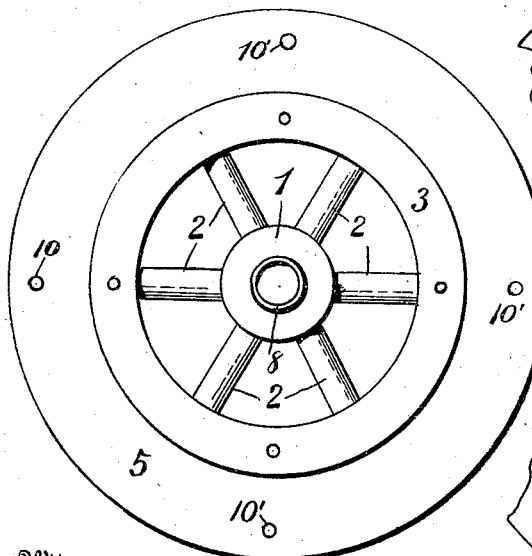
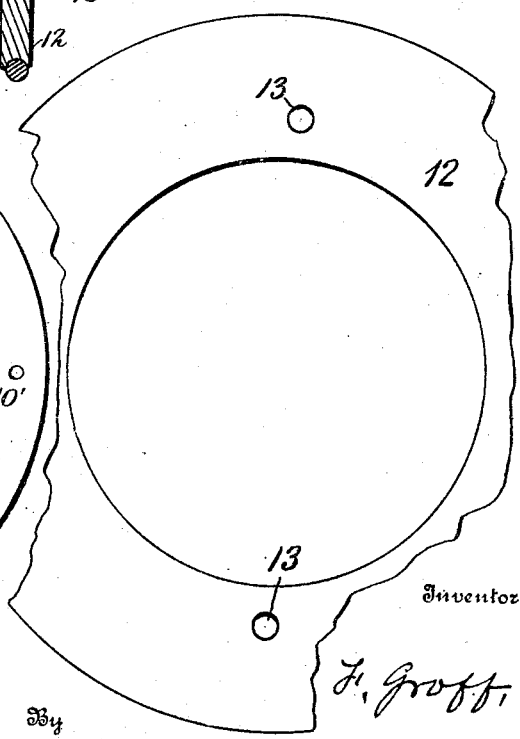

UNITED STATES PATENT OFFICE.

FAYETTE GROFF, OF ST. JOHNSVILLE, NEW YORK.

VEHICLE CUSHION-WHEEL.

No. 928,601.  Specification of Letters Patent.  Patented July 20, 1909.

Application filed April 7, 1908. Serial No. 425,589.

*To all whom it may concern:*

Be it known that I, FAYETTE GROFF, a citizen of the United States, residing at St. Johnsville, in the county of Montgomery and State of New York, have invented certain new and useful Improvements in Vehicle Cushion-Wheels, of which the following is a specification.

My invention has relation to new and useful improvements in vehicle wheels, one of which is especially adapted to automobiles, but which will be equally useful and serviceable on vehicles of any class.

The object of my invention is to provide a wheel that will be durable, economical, simple in construction, and arranged so that the pneumatic tire or other cushion employed, will not be subjected to the wear and tear that they usually have to contend with.

A further object of my invention is to provide a wheel that may resemble in appearance that of an ordinary wagon wheel, but which will have the same resiliency as when the pneumatic tire is employed in the ordinary manner, and, at the same time the pneumatic tire used, cannot be punctured, or is not subjected to the usual various strains and stresses.

With these and other objects in view, my invention consists of the novel construction and arrangements of parts as are hereinafter described in the following specification and specifically pointed out in the claims hereunto appended.

Figure 1:
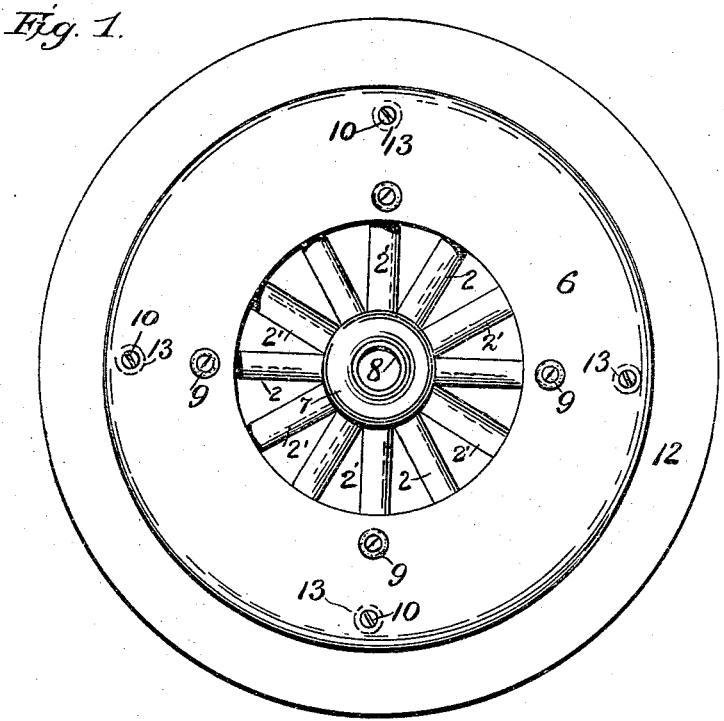
Figure 2:
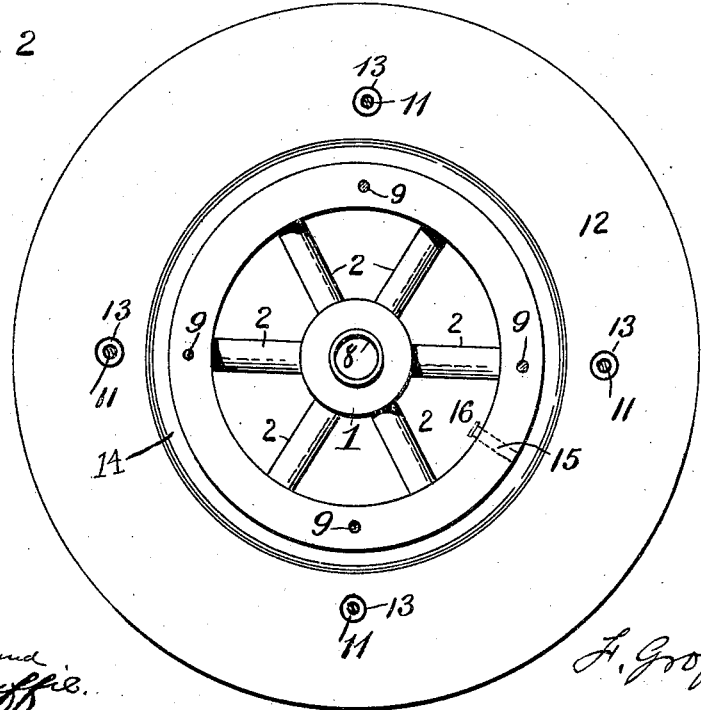

Reference being had to the drawings, Figure 1 is a side elevation of my new spring wheel, ready for use. Fig. 2 is a side elevation of my invention, having the flange section removed. Fig. 3 is a vertical sectional view of my wheel. Fig. 4 is a face view of the wheel, the flange section and protecting rim removed. Fig. 5 is a face view of the protecting rim, partly broken away.

Referring more particularly to the drawings, which form a part of this specification, the hub 1, has a number of spokes 2, running radially from its periphery to the felly 3, which is formed to or secured to the outer ends of said spokes. The said felly has cut from its inner side an annular recess or groove 4, thus leaving the endless flange 5. Attention is directed to the fact that the outer periphery of said felly, or that part whereon rests the pneumatic tire, is perfectly flat; and it is also especially pointed out that the spokes of my improved wheel run directly from the hub to the central part of the inner periphery of said felly, thus bearing all of the weight of the vehicle directly. It is further pointed out that the flat outer surface of said felly is made thus, and is sufficiently wide to allow the pneumatic tire 14 to spread or flatten almost to its fullest extent, if necessary, when pressure is applied thereon, and thus the resiliency gained will not reside alone in the resiliency of the air within the tire, as has been heretofore the usual result caused by the particular construction of spring wheels.

The flange section 6, has a hub 7, which corresponds to the hub of the main portion of the wheel, and fits over that portion of the tubing 8, which protrudes from the inside of the hub 1. The spokes $2^1$, of the flange do not correspond to the spokes of the main section of the wheel, but extend radially so as to bisect the respective angles, formed by each two adjacent spokes of the main section of said wheel, it being thought by this arrangement to materially strengthen the wheel by spreading the weight more evenly throughout a greater field.

The flange section 6, is secured by means of a series of screws 9, or nut and bolt connections, to the felly of the said wheel. A series of corresponding holes 10, and $10^1$, are passed through the flange of the wheel and the flange portion of the flange section 6, through which pass the bolts 11. The protecting rim 12, of the wheel works between the flange of the main section and the flange portion of the flange section, and also has a series of holes 13, passed therethrough, which correspond to the said holes of the said flange of the main section and flange of the flange section. These holes 13, are larger in diameter than said holes 10 and $10^1$, so that the protecting rim might have sufficient play in a vertical or horizontal direction when the wheel is in motion. The outer periphery of the said protecting rim is preferably concave, as shown, and has a hard rubber tire cemented, or secured thereto by any substantial means. Lying on the outer surface of the felly of said wheel is the said pneumatic tire 14, against which works the protecting rim of said wheel. So that this tire might be inflated, a perforation 15, (Fig. 2) is cut through the felly, radially, through which a valve stem 16, of said tire is passed.

Though I have specifically described my invention, I claim the right to make such alterations and changes as will clearly fall within the scope, and not depart from the spirit of my invention, and which will be obviously necessary in its manufacture.

Having described my invention, what I claim as new and desire to secure by Letters Patent, is:—

1. A device of the character described, comprising a main section and a flange section, said main section composed of a hub, radially extending spokes, having a felly formed to the outer ends thereof, said spokes so arranged against the inner periphery of the said felly as to bear the weight of a vehicle directly, said felly having an annular recess cut therein, leaving an endless flange, the outer peripheral surface of said felly being flat, said surface being of a greater width than the diameter of the pneumatic tire which is intended to play thereon, said flange section having a hub, spokes and a flange portion, said hub and said flange portion corresponding to the said hub and said flange of said main section respectively, the flange of said main section, and flange portion of said flange section each provided with a series of corresponding holes, means to secure said flange section to said main section; a protecting rim having a series of enlarged holes, corresponding to said holes of said flange of said main section, and said flange portion of said flange section giving said protecting rim lateral movement; bolts passing through said holes in said flange of said main section, and said flange portion of said flange section, and through the center of the said holes of said protecting rim, when said tire is inflated, and said protecting rim is in its normal position, said protecting rim working between the flanges of said main section and said flange section and against the said pneumatic tire, substantially as shown.

2. In a device of the character described, the combination of a main section, a flange section, a pneumatic tire and a protecting rim; said main section and said flange section having corresponding hubs and flanges, spokes, said spokes of said flange section bisecting the angles formed by each two adjacent spokes of the main section, the said protecting rim working between said flanges of said main and said flange sections, especially in a vertical plane, when the same is in operation, substantially as shown and described and for the purposes set forth.

In testimony whereof I affix my signature, in presence of two witnesses.

FAYETTE GROFF.

Witnesses:
 FRED D. STORMS,
 SAMUEL PAUL.